United States Patent [19]

Neustadt

[11] 3,862,371

[45] Jan. 21, 1975

[54] MESSAGE TRANSMISSION SYSTEM WITH PULSE COMPRESSION

[76] Inventor: Hans Neustadt, 6050 Offenbach, Offenbach, Germany

[22] Filed: Jan. 26, 1973

[21] Appl. No.: 327,216

Related U.S. Application Data

[63] Continuation-in-part of Ser. No. 116,518, Feb. 18, 1971, abandoned.

[30] Foreign Application Priority Data

Feb. 24, 1970 Germany .......... 2008560

[52] U.S. Cl. .......... 179/15 AC, 178/66 R, 325/38 R, 325/324

[51] Int. Cl. .......... H04b 7/00

[58] Field of Search .......... 178/66–68; 179/15 AC, 15 AP, 15 AV; 325/32, 34, 38 R, 39, 40, 61, 141, 321–324

[56] References Cited

UNITED STATES PATENTS 3,469,189 9/1969 Miller, Jr. .......... 325/38 R 3,654,554 4/1972 Cook .......... 325/32

*Primary Examiner*—Benedict V. Safourek

*Assistant Examiner*—Marc E. Bookbinder

*Attorney, Agent, or Firm*—Hill, Gross, Simpson, Van Santen, Steadman, Chiara & Simpson

[57] ABSTRACT

A message transmission system which utilizes pulse code modulation with a discontinuous modulation function and receiving-side pulse compression, in which the codes are composed of alternating individual elements to provide a time variation of coding, wherein each individual element in itself has an additional further modulation and wherein apparatus is provided at the receiver for compressing both on the basis of the discontinuous modulation function and the additional modulation function.

3 Claims, 8 Drawing Figures

INVENTOR
Hans Neustadt
BY
Hill, Sherman, Meroni, Gross & Simpson
ATTYS.

INVENTOR
*Hans Neustadt*
BY
*Hill, Sherman, Meroni, Gross & Simpson*
ATTYS.

INVENTOR
Hans Neustadt
BY
Hill, Sherman, Meroni, Gross & Simpson
ATTYS.

MESSAGE TRANSMISSION SYSTEM WITH PULSE COMPRESSION

CROSS REFERENCE TO RELATED APPLICATION

This application is a continuation-in-part of Ser. No. 116,518, filed Feb. 18, 1971, now abandoned.

BACKGROUND OF THE INVENTION

1. Field of the Invention

This invention relates to message transmission systems, and more particularly to message transmission systems which utilize pulse compression and techniques for comparing a received code sequence with an internally generated code sequence in order to determine the authenticity of the received code sequence.

2. Description of the Prior Art

Under the generic term pulse compression systems it is possible to realize constructions of optimal filters by two processes. In pulse compression of signals having discrete partial signals (a discontinuous modulation function) there is connected in circuit after each delay section a filter which corresponds to the apertaining individual partial signal. At a coincidence time point, the output signal appears having an amplitude which is increased by the compression filter. If the partial signals (in whole or in part) occupy a common frequency range (for example, in the case of phase shift coding) there arises what are generally called side-coincidences which depend upon the signal sequence. The signal sequence, or code, can be changed by inserting a connection matrix or by directly controlling the filter at will and in a simple manner. The compression factor corresponds to the number of delay members; therefore, great code lengths lead to correspondingly expensive system constructions, for example in delay lines or shift registers having many taps.

However, pulse compression which utilizes a continuous modulation function within the transmitted signal is based on a linear modulation, for example a frequency modulation (a linear frequency sweep or change), within the time modulation of a pulse. For this type of pulse compression there is provided a filter having a transmission characteristic which is inverse to the modulation function. The partial signals in this type of system occur in a certain sense continuously in that they extend over into one another. The optimal filter (dispersive delay line) has a homogeneous structure which virtually precludes any change in the transmission function (that is, a code change), because of the possibility of providing a corresponding individual filter for each signal is excluded for code values of interest in the present state of technology. On the other hand, the homogeneous construction makes high compression factors possible with low distortion losses.

Accordingly, in both of the foregoing cases, the received signal proper arises as an auto correlation function of the transmitted signal in the receiver. This receiver transformation is accommodated by an optimal filter which is adapted to the structure of the signal to be received (a matched filter). Accordingly, and corresponding to the various signal structures, there is provided in the two processes different constructional realizations of the filter, whose advantages and disadvantages lie, in part, in different areas. Thus, a filter with discrete structure offers the possibility of changing the set-in code rapidly and with low additional expenditure; on the other hand, the basic expenditure rises approximately proportionately with the code length and the compression factor. In the case of the continuous filter the latter dependence is not mandatory, nor compulsory. High compression factors ($K > 100$) are attainable; and as a rule, the code length has no influence on the structural size of the filter. However, the homogeneous filter structure prevents the desired signal change in order to limit the possibility of imitation.

Techniques for effecting frequency increase and decrease and receiver-side compression in radar signaling systems are found in the book Introduction to Radar Systems particularly at pp. 86–89 and 493–499, Merril I. Skolnik, McGraw-Hill Book Company, Inc., 1962. The present invention utilizes a unique combination of such teachings in obtaining the improved message transmission system. This publication is therefore fully incorporated herein by reference.

SUMMARY OF THE INVENTION

Underlying the invention, and associated with its primary objective, is the problem of creating a message transmission system which supplies both high compression factors and an extensive code supply. Proceeding from a message transmission system which uses pulse-code modulation with a discontinuous modulation function and pulse compression at the receiver, in which system the codes are composed of changing individual elements to establish the time variation of coding, the foregoing objective is realized by means which provide each individual element with an additional further modulation and means at the receiving side to carry out a compression on the basis of both the discontinuous and the additional modulation functions.

In order to explain the advantages of the invention an example is taken as a starting point, for which there are the following functions:

Compression factor $K=100$

Supply of differing signals (code supply) $N=1,000$

Further, let it be assumed that the additional modulation runs constantly.

a. For a construction of only compression filters (i.e., the utilization of only a steady, constant modulation function) an expenditure of all together 1,000 pieces is required, which would have to be arranged and connected in a sort of filter band.

b. In the case of a discontinuous modulation function there are required filters with at least 100 stages in order to achieve the desired compression factor. The expenditure required for this case exceeds the stage number necessary for coding by many orders of magnitude. The total code supply is provided from the number of stages M at $$K=2^M$$

For $N=100$ the code supply lies above the figure sought by the factor of $10^{27}$.

c. The construction of the transmission system corresponding to the teachings of the instant invention makes it possible, with the desired code supply, to proceed from a number of stages of the discontinuous compression filters of $M = 10$. Since the compression factors are multiplied, a compression factor of $K = 10$ suffices for a filter with the steady modulation function. In detail, there is then provided the following comparison: the transmission system according to the invention combines about 1/100 of the expenditure of the solution according to paragraph (a) above, that is, a filter with a compression factor $K = 10$ as compared to 1,000 filters with a compression filter $K = 100$; and with 1/10 the expenditure of paragraph (b) above, in order to achieve the desired properties.

BRIEF DESCRIPTION OF THE DRAWINGS

Other objects, features and advantages of the invention, its organization, construction and operation will be best understood from the following detailed description of preferred embodiments of the invention, taken in conjunction with the accompanying drawings, in which.

DESCRIPTION OF THE PREFERRED EMBODIMENT

Figures 1, 1A, 3, 4:
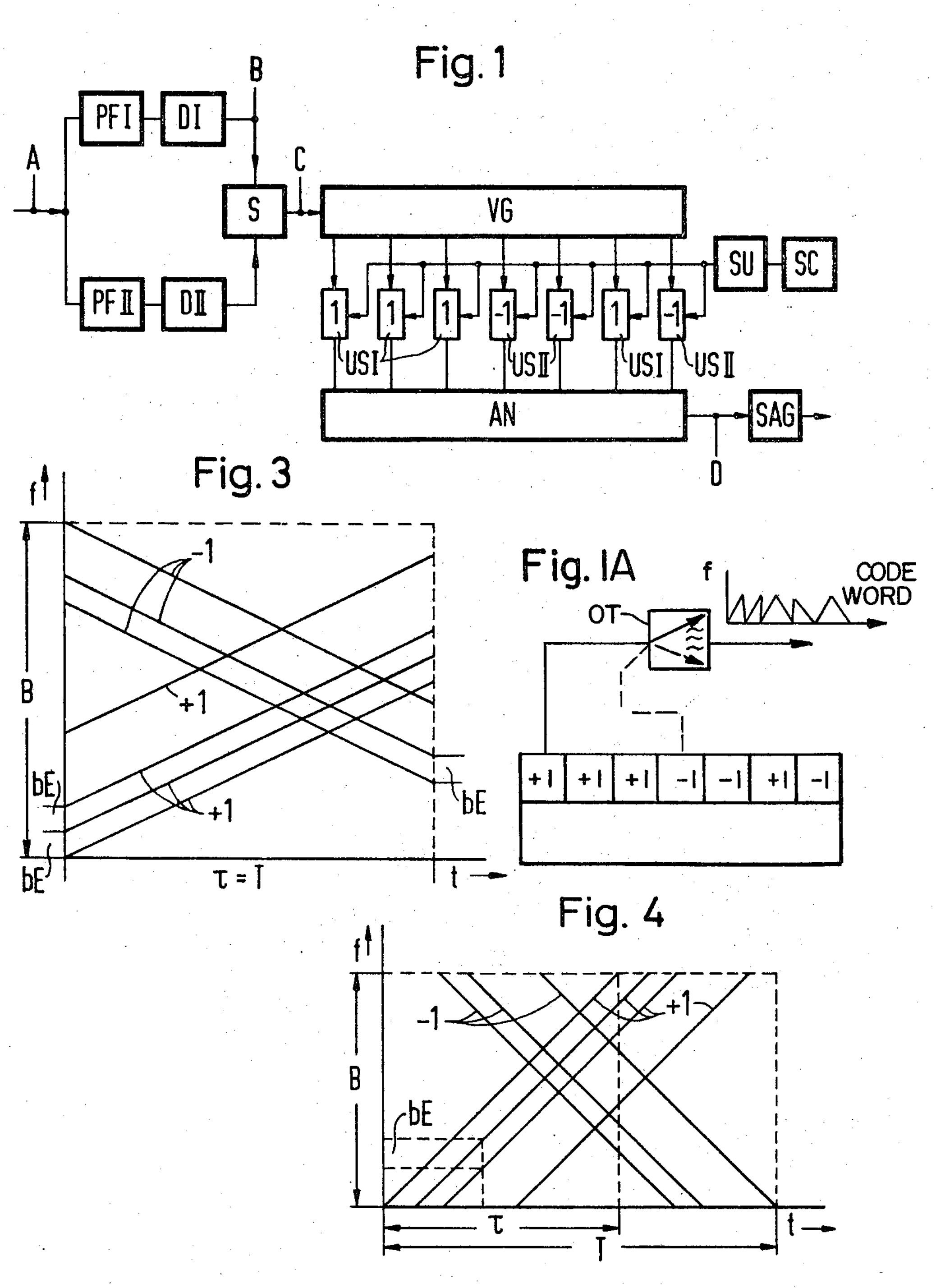
FIG. 1 is a block diagram illustration of a receiving device for decoding received signals which have been modulated in accordance with the principles of the present invention.
FIG. 1A is a block diagram illustration of oscillator control to produce code words.
FIG. 3 is a graphical illustrative diagram of a further possibility for the formation of the additional modulation function.
FIG. 4 is a graphical illustration of a modification of the additional modulation function according to FIG. 3.

In the block diagram circuit example illustrated in FIG. 1, the signals are supplied to an input A which is connected to a pair of pulse compression filters PF I and PF II. The outputs of the pulse compression filters PF I and PF II are connected to respective demodulators D I and D II. The outputs of the demodulators D I and D II are fed to a subtraction device S which is connected to a delay member VG. The delay member VG can be constructed as a delay line or as a shift register and has a series of taps, which in the present example is seven in number. A plurality of monitoring circuits US I and US II are connected to respective taps of the delay member VG. For each of the monitoring circuits US I there is provided the value "1" and for the monitoring circuits US II there is provided the value "−1" (negation). For setting the distribution for the values "1" and "−1" there is provided a switch control unit SU which is controlled by a code generator SC. The received signals pass, after the monitoring circuits US I and US II to an additional network AN and stand (in line) in an added form at the output D for further processing. The system further includes in the receiver a stage SAG connected to the output of the addition network AN to provide the threshold value.

Figure 2A:
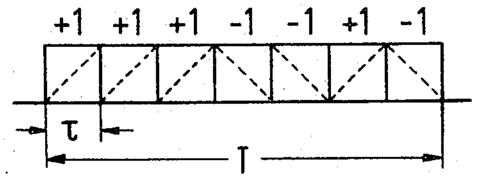
FIGS. 2A–2D illustrate the signal occurrences at the points A to D of the circuit diagram of FIG. 1.

The signal fed in at the input A in the case of correct coding is schematically represented in FIG. 2A. For this example the code has a total of seven elements whose total duration amounts to the interval T. An individual element of this code has, for example, the duration$\tau$; it being generally assumed that all the individual elements are of equal length. Each of these individual elements is subjected to an additional modulation function which in the present example is a continuous modulation function and which is represented in FIG. 2A by a broken rising or falling, respectively, line. The broken lines rising to the right indicate that the frequency of the individual element becomes constantly greater as time increases, while the broken lines falling off to the right are to indicate that the individual frequency modulation function decreases as time increases. If the rising frequency modulation function is allocated the value "+1" and the falling modulation is allocated the value of "−1," then the code represented in FIG. 2A has, after decoding of the steady frequency modulation function, the distribution:

$$+1, +1, +1, -1, -1, +1, -1$$

The pulse compression filter PF1 is constructed in such a way that code elements with a rising frequency modulation function (corresponding, for example, to the first individual element according to FIG. 2A) are impressed, while those with falling frequency modulation functions (correspondingly, for example, to the fourth individual element according to FIG. 2A) are dispersively influenced. For such pulse compression filters there are a number of forms of execution in which above all dispersive delay lines are used, i.e., devices that bring about a frequency-dependent delay of signals. Since from the pulse compression filter PF1 only signals with rising frequency modulation (+1) are influenced, there is provided at the output of the demodulator DI, i.e., at the point B, the signals represented in FIG. 2B. At each point in the code where there was present a rising frequency modulation function in FIG. 2A there is provided a strongly pronounced maximum, while in the intermediate ranges, i.e., where a falling frequency modulation function (−1) was present in the code, only very small submaxima are present. Therefore, there appears, first of all three strong signals, then (at −1) there are two signals lacking. This is followed by a further strong signal (+1) and then the absence of a signal (−1).

For the pulse compression filter PFII, whose construction with respect to the frequency modulation function is chosen inversely to that of the filter PFI there is yielded correspondingly pronounced maxima in the case of falling case modulation function (−1) and only slight submaxima or gaps at points of the rising frequency modulation function (+1). The time distribution of these maxima is illustrated in FIG. 2C, where these maxima are represented beneath the time axis as negative signals, because they have undergone a sign reversal in the subtraction stage S. The signals decoded in this manner correspond, aside from the submaxima to a simple active binary code, i.e., to a "+1, −1" distribution.

The signal according to FIG. 2C passes to the delay member VG, which has seven taps shifted in time in each case by the interval $\tau$. It is clearly evident by this construction that the seven individual signals according to FIG. 2C all occur simultaneously on the taps as a series-parallel transformation. If the code supplied from the code generator SC and correspondingly reformed by the switching control SU has the same coding as the coding of the signal according to FIG 2C, then the first three as well as the sixth switch-over devices USI, which are designed with "1," pass signals without sign, while the fourth, fifth and seventh switch-over devices USII change the signals in sign. The signal distribution according to FIG. 2C corresponds exactly to the code put in by the code generator SC, and at the point D, i.e., at the output of the addition network AN there appears an individual strongly pronounced pulse AG. This pulse is represented in FIG. 2D and has theoretically seven times the magnitude of a maximal pulse of FIG. 2B or FIG. 2C, because through the switch-over devices USI (the fourth, fiftn and seventh of such devices) the negative peaks according to FIG. 2C have been reversed in polarity. The further occurring submaxima (which holds also for the signals according to FIGS. 2B and 2C) can expediently be reduced by corresponding devices in conjunction with the compression function, so that practically only the maximum signal amplitudes are permitted through for utilization and submaxima of the first and second compression stages do not cause trouble.

Figure 2B:
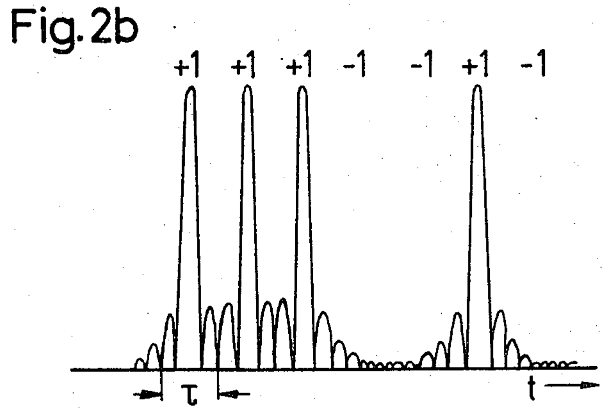
Figure 2C:
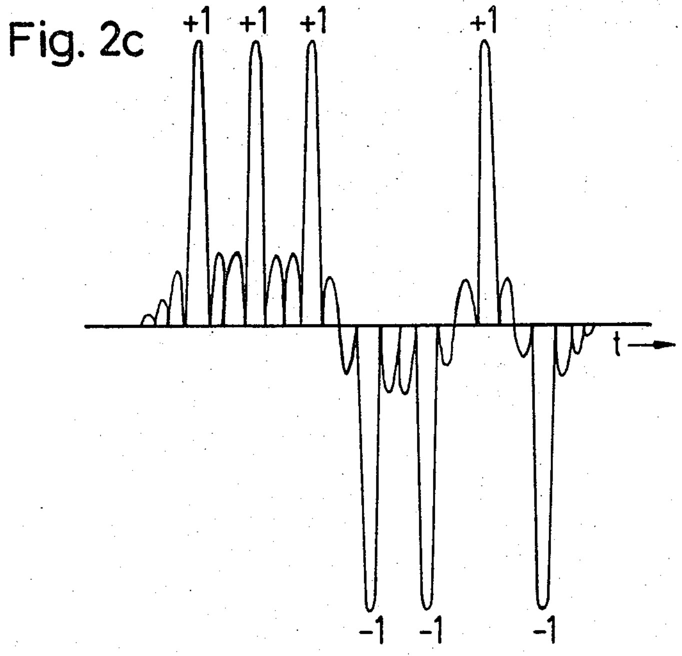
Figure 2D:
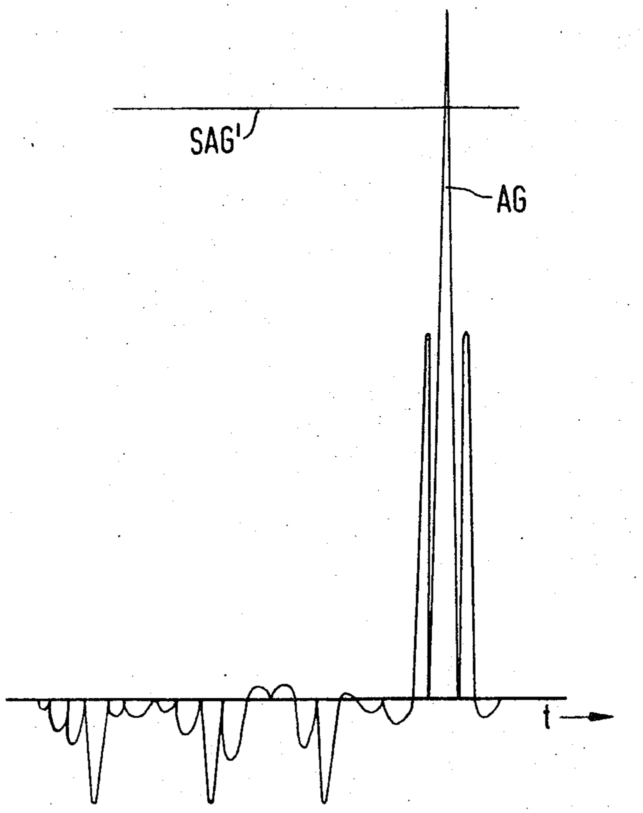

If a signal arrives whose frequency modulation function does not have the distribution represented in FIG. 2A, then there is provided signal distributions other than those represented in FIGS. 2B and 2C. Thus, for example, if the code according to FIG. 2A had the distribution +1, +1, +1, −1, −1, −1, −1, at the point B and in FIG. 2B there were only three maximal signals present, while at the output of the demodulator DII and in FIG. 2C for maximal (negative signals) would occur. This would have a consequence that for the code set in at the devices USI and USII, the penultimate (sixth) switch-over device USI would have the wrong sign and, accordingly, in the addition network AN it would not be seven equal amplitudes that would be superimposed, but only six and one negative amplitude. The resulting sum, signal AG according to FIG. 2D, would not, for the assumed example, reach the value required by the threshold SAG′, and would thereby be prevented from the passage for further evaluation and processing.

As stated in connection with FIG. 2-A, each individual element is modulated with a steadily increasing or steadily decreasing modulation frequency. In a different context, one may refer to pp. 86–89 of the aforementioned Skolnik publication. Therefore, a steady increase of frequency refers to a +1 and a steady decrease to a −1. The code generator SCT in FIG. 1-A is included on the transmission side. The code program according to FIG. 2-A has been illustrated on FIG. 1-A. Accordingly, an increase in frequency of the oscillator OT is carried out with the first code element (+1), as indicated by the lines having an increasing slope in the oscillator OT; and an increase in frequency is also carried out with the second and third code elements. However, with the fourth code element (broken line), a decrease in frequency will be effected due to the −1, which is indicated by the downwardly directed broken arrow in the oscillator OT. The fifth code element again shows a decreasing frequency function; the sixth code element an increasing frequency function and the seventh code element a decreasing frequency function. The pulse train produced in accordance with the above has been illustrated on the righthand side of the oscillator OT, whereby the ordinate represents frequency in the same manner as in connection with FIG. 2A. This "code word" is transmitted, for example radiated by an antenna, and then extended toward the point A of the receiver illustrated in FIG. 1.

Briefly a number of code elements are provided in a code word. Each one of these code elements has one of two possible states (discontinuous modulation function) which are denoted by the +1, −1, in FIGS. 1A and 2A. In FIg. 2A, the increase of frequency corresponds, as noted above, to the +1 and the decrease of frequency by the −1 symbol. Heretofore, a pulse train only consisted of steadily increasing frequencies or steadily decreasing frequencies, while the "code word" of the present invention consists of several of such code elements with different modulation functions. It is essential that a double pulse compression is effected at the receiving side. Therefore, the first code element in FIG. 1 is compressed by the pulse compression circuit PFI. This will provide that not one pulse train extend over the duration $\tau$ with a constant amplitude, but that the train occurs only a fraction of $\tau$ and with a very great amplitude (denoted by +1 in FIG. 2B). Code delements having decreasing frequencies are compressed by the pulse compression filter PFII and will also result in a very great amplitude with a time duration smaller than $\tau$. These amplitude peaks are indicated by the −1 symbol in FIG. 2C. The −1 symbol is due to the fact that the stage S in FIG. 1 is a subtraction circuit, whereby the code elements of the demodulator DI are provided with positive signs and the code elements of the demodulator DII are provided with negative signs.

The amplitude peaks according to FIG. 2C, which are now only modulated discontinuously (namely the +1, +1, +1, −1, −1, +1, −1) are again compressed in the network on the right of point C in FIG. 1, and therefore will theoretically result in pulses as described in connection with FIGS. 1 and 2D, having amplitudes, amounting to about seven times the peaks according to FIG. 2C. These high compression factors, which could not heretofore be obtained in prior art compression devices are easily obtained in practicing the present invention. Therefore, the invention comprises the additional advantage that the discontinuous modulation function can be changed by respectively adjusting different (but mutually equal) codes with the code generator SC.

Further possibilities of the additional modulation consist in a frequency keying-over or a phase shift modulation of the individual elements of the code which is compressively evaluated.

In FIG. 3 a further example is illustrated by plotting for the additional modulation the instantaneous frequency of a modulation function with respect to time in which $\tau = T$, i.e., each individual element of the code is present during the entire code duration T and there is altogether required a band width $b$. The code used in the present example again has the distribution $$+1, +1, +1, -1, -1, +1, -1$$

in which +1 corresponds in each case independently of time to a frequency rise, whereas −1 corresponds independently of time to a frequency decline. The distinction of the individual elements is assured by a certain frequency spacing bE. The structure of the compression device corresponds to the example illustrated in FIG. 1 in which the compression filters PFI and PFII have to process at least the band width B as linearly as possible. Correspondingly, after the compression at the point B there is provided pulses of the type represented in FIG. 2B, while at the point C there occurs a distribution according to FIG. 2C. Further processing takes place in the manner explained above with reference to FIG. 1.

In the modification of the invention represented in FIG. 4, the principle of additional modulation $\tau$ and the total duration T are chosen unequal i.e., the additional modulation is not active during the entire duration T of a code. It is further assumed that the individual additional modulation functions begin and end successively in time so that there results a kind of time multiplex.

The invention is applicable to particular advantage where large code quantities are required in order to circumvent aimed interferences and imitations through a rapid code change. In addition to applications in the field of secret communications, the invention is therefore particularly advantageous when applied to friend-foe identification in connection with secondary radar apparatuses.

I claim:

1. A message transmission system which utilizes pulse code modulation wherein the code words are comprised of code elements with a duration $\tau$ and the code elements comprise a discontinuous modulation function in the form of one of two possible states, one of these states being a time dependently rising frequency function and the other of these states being a time dependently falling frequency function, the system comprising a transmitter including means for effecting said rising and falling frequency functions for each individual code element and a receiver including an input and two parallel paths connected to said input, one of said paths including a pulse compression filter for said time dependently rising frequency function and the other of said paths including a pulse compression filter for the time dependently falling frequency function, each of said filters connected to said input, a pair of detectors connected to respective ones of said filters, a common subtraction device connected to the outputs of said detectors of both of said paths for reversing the sign of the signals of one of said paths, a delay member connected to said subtraction device and having taps shifted in time by the interval $\tau$, a plurality of monitoring circuits including one type of monitoring circuit for allowing passage of signals compressed in one of said paths and a second type of monitoring circuit for allowing passage of signals compressed in the other of said paths, said monitoring circuits connected to said taps of said delay member, the distribution thereof being the same as the distribution of said two states in the transmitted signal and therefore maintaining a second pulse compression of the received signal, a common addition network connected to the outputs of said monitoring circuits for receiving the signals passed thereby and responsive to such signals to provide a strongly pronounced pulse only for such code words of which the elements thereof contain the modulation function corresponding to the distribution of the types of monitoring circuits connected to said taps of said delay member.

2. A method of transmitting code words in a system, digitally, wherein the code words are comprised of a plurality of code elements each having a duration $\tau$, and the code elements comprise one of two possible states, one of these states being a time dependently rising frequency function and the other of these states being a time dependently falling frequency function, comprising the steps of: transmitting the code words; receiving the code words; and compressing the received code words on the basis of the time dependent rising and falling frequency functions thereby producing a first compressed signal and compressing said first compressed signal digitally to improve the output signal to noise ratio.

3. A method of transmitting code words in a secondary radar system, digitally, wherein the code words are comprised of a plurality of code elements each having a duration $\tau$, and the code elements comprise one of two possible states, one of these states being a time dependently rising frequency function and the other of these states being a time dependently falling frequency function, comprising the steps of: transmitting the code words; receiving the code words; and compressing the received code words on the basis of the time dependent rising and falling frequency functions thereby producing a first compressed signal, and compressing said first compressed signal digitally to improve the output signal to noise ratio.

* * * * *